April 25, 1933.  F. J. BAST  1,905,788
TEMPERATURE AND PRESSURE CONTROLLER
Filed July 3, 1931   2 Sheets-Sheet 1
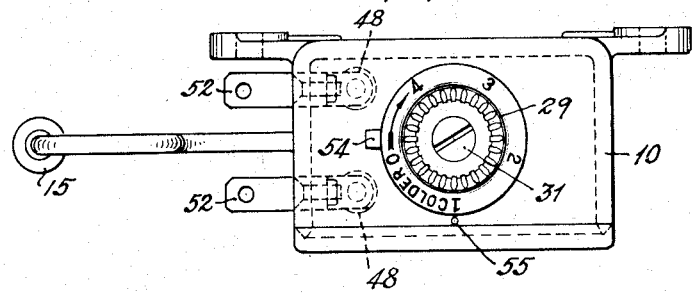
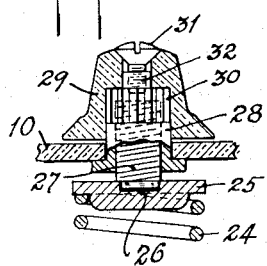
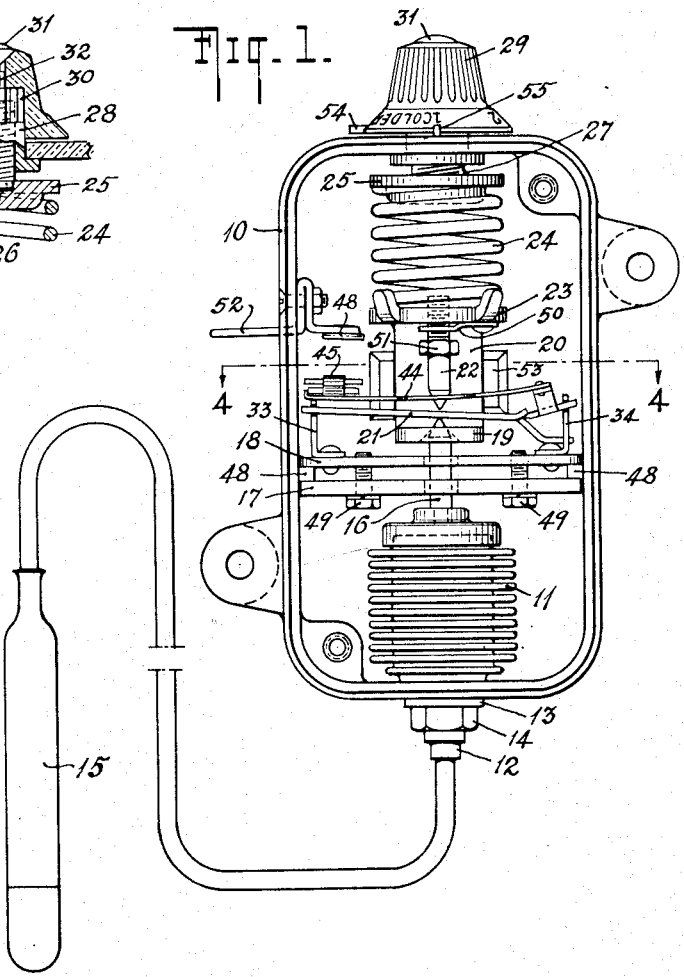
WITNESS
G. V. Rasmussen
INVENTOR
FRANK J. BAST
BY
ATTORNEYS April 25, 1933.  F. J. BAST  1,905,788
TEMPERATURE AND PRESSURE CONTROLLER
Filed July 3, 1931  2 Sheets-Sheet 2
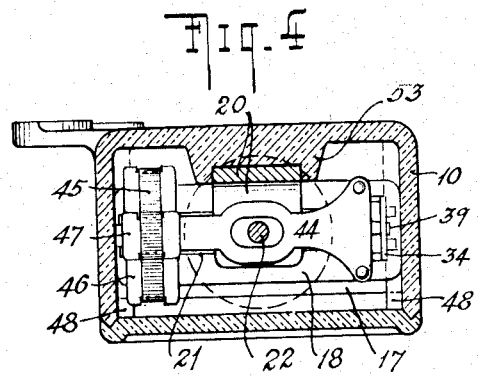
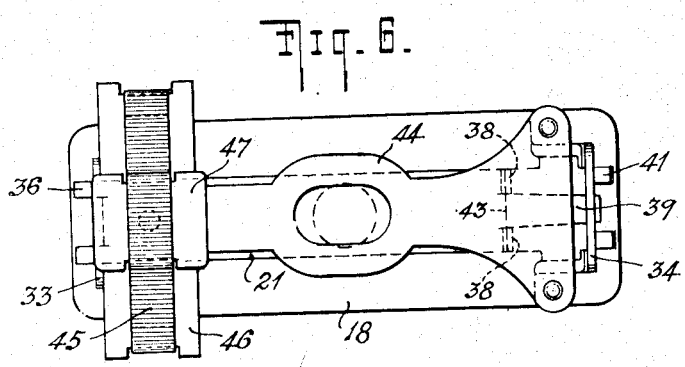
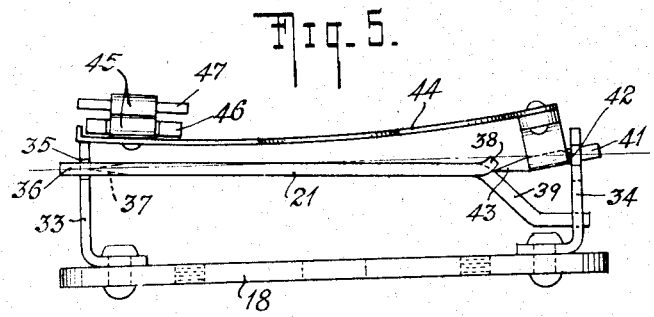
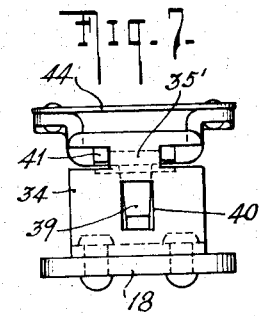
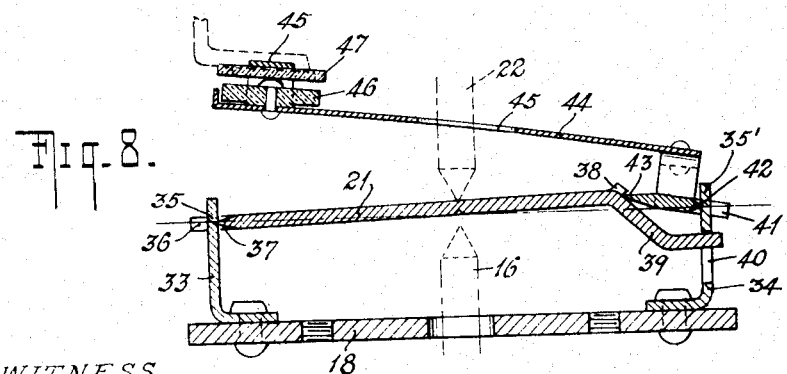
WITNESS
INVENTOR
FRANK J. BAST
BY
ATTORNEYS Patented Apr. 25, 1933

1,905,788

UNITED STATES PATENT OFFICE

FRANK J. BAST, OF QUEENS VILLAGE, NEW YORK, ASSIGNOR TO CHARLES J. TAGLIABUE MFG. CO., OF BROOKLYN, NEW YORK, A CORPORATION OF NEW YORK

TEMPERATURE AND PRESSURE CONTROLLER

Application filed July 3, 1931. Serial No. 548,520.

The present invention relates to temperature and pressure controllers and in particular to an electric switch operable in response to variations in the physical conditions at a selected point to open or close an electric circuit to an electrically operated device.

Briefly described, my improved switch-operating mechanism comprises a toggle joint arrangement which is so constructed that initial movement thereof will not affect the switch, but as the toggle elements or plates approach the dead center or neutral plane position they quickly snap into their reverse position and close or open the switch, as the case may be, with a very rapid and positive snap action, so that arcing and sparking at the switch contacts are practically eliminated.

A control switch of this general type has already been suggested for use in connection with temperature-responsive mechanism, but in such known device one of the toggle elements is itself the thermostatic member and the other toggle element and a switch arm connected thereto to be oscillated thereby are constantly under the influence of the thermostatic toggle member, and are subjected to greater and greater stress as the thermostatic member becomes more and more distorted with excessive increase or decrease of temperature. In such known mechanism, therefore, the toggle elements and the switch arm are subjected to additional distortion and considerable strain even after the desired operation of the switch has been accomplished. As a result, the operating parts of the switch are subjected to unnecessary and excessive forces which tend ultimately to impair the operation of the mechanism, diminish its sensitivity and reliability, and reduce the useful life thereof.

One of the objects of the present invention is to provide a switch mechanism of the type indicated above in which excessive strains upon the toggle joint elements and the switch arm are avoided and wherein substantially only so much force is applied thereto as is necessary to effect the snapping action and hold the switch in its adjusted position. I accomplish such object in the preferred form of the invention by making the temperature (or pressure) responsive member external of and separate from the toggle joint structure and by interposing a stop between such temperature (or pressure) responsive member and the switch mechanism in such a manner, that after the responsive member has accomplished the degree of movement requisite to effect throwing over of the switch, it is held against further movement in the same direction and thus prevented from exerting additional pressure and thereby further distorting the switch mechanism.

It is also an object of the invention to provide a switch for temperature and pressure controllers, particularly of the remote control type, which can be simply and easily adjusted both to vary the temperature or pressure at which the switch is operated, and to vary the differential between the temperatures or pressures at which the switch is closed and again opened.

It is a further object of the invention to provide a mechanism of the type indicated which is simple in construction and reliable in operation. Other objects of the invention will be apparent from the following description and the features of novelty will be set forth in the appended claims.

The accompanying drawings illustrate by way of example a preferred embodiment of the invention, the device shown being adapted for use with a refrigerating system. In said drawings, Fig. 1 is a view in elevation of a controller embodying the present invention, the cover plate being removed to reveal the internal mechanism; Fig. 2 is a top plan view of the assembled structure; Fig. 3 is a detail of one of the adjusting mechanisms; Fig. 4 is a horizontal section on the line 4—4 of Fig. 1; Fig. 5 is an enlarged view in elevation of the toggle mechanism and switch arm; Figs. 6 and 7 are, respectively, a top plan and an end view of the mechanism shown in Fig. 5; and Fig. 8 is a sectional view similar to Fig. 5 but showing the parts in a different position.

The numeral 10 indicates a casing preferably made of an insulating molding composition, such as bakelite. Attached to the bottom wall of the casing is an expansible metallic bellows 11 provided with a threaded hollow connection 12 which extends through a suitable opening in the casing and receives a washer 13 and nut 14 for clamping the bellows to the casing. The bellows communicates with a source of a fluid under pressure and is so constructed that it will expand and contract in response to changes in the pressure of such fluid. The bellows may be connected directly with the interior of a vessel or other apparatus whose temperature or pressure is to be controlled, or it may be connected to a thermostatic bulb 15, as illustrated in the drawing, such bulb being partly filled with a volatile liquid whose vapor pressure will vary in response to changes in the temperature at the control point where the bulb is located.

Attached to the top of the bellows 11 is a stem 16 which passes loosely through two plates 17 and 18. The upper end of the stem is preferably tapered and passes through a tapered opening in a horizontally extending arm 19 of a yoke 20, the extreme end of the stem extending above such arm and engaging a toggle plate 21. The opposite face of the toggle plate 21 is adapted to be engaged by a rod 22 fixed to and depending from the upper arm 23 of the yoke 20, the rod 22 and yoke 20 being pressed downwardly by a spring 24 whose lower end rests upon the arm 23 and whose upper end bears against a plate 25. The latter is provided with a rectangular slot 26 designed to receive the similarly shaped bottom end of a screw 27 which is thereby held against rotation. The screw 27 is moved axially, by rotation of an internally threaded nut 28 which extends through the casing and is operated by a finger-piece or dial 29 which is internally fluted and interlocks with a similar fluted portion 30 of the nut 28. The dial 29 is held in place on the nut 28 by means of a screw 31 which is received in an internally threaded extension 32 of the nut.

The toggle joint mechanism is supported upon two plate springs 33 and 34 (see Figs. 5, 7 and 8). The spring support 33 is provided with a reduced neck 35 and the left-hand end of the toggle plate 21 is bifurcated as shown at 36 to straddle such neck portion. The toggle plate 21 is provided with a knife edge 37 bearing against the neck 35 so that the toggle plate is pivoted against the spring support 33 and held against lateral displacement. The toggle plate 21 is struck up intermediate its ends to form two lateral ears 38, the central portion of the plate being bent downwardly as shown at 39 and positioned within an opening 40 in the spring support 34. A second toggle plate 41, considerably shorter than the plate 21, is provided with bifurcated ends and a knife edge 42, which embrace and pivot against, respectively, a reduced neck portion 35' of the support 34 in a manner similar to the mounting of the toggle plate 21 upon the support 33. The toggle plate 41 has also a knife edge 43 at its inner end which engages between the struck up ears 38 and the downwardly bent portion 39 of the plate 21. It will thus be seen that the blades 21 and 41 are pivotally supported on knife edges by the spring supports 33 and 34 and can be moved into a horizontal plane against the tension of such supports, the vertical movements of the toggle being limited by the engagement of the portion 39 with the upper or lower wall of the opening 40.

The shorter toggle plate 41 has attached thereto a resilient switch arm 44 which is provided with an opening 45 through which the rod 22 loosely passes. Upon the free end of the arm 44 is positioned a metallic jumper 45 which is insulated from the arm 44 by the non-conducting strip 46, the central portion of the jumper 45 being raised and resting upon an additional piece of insulation 47 so as to lie between the pair of contacts 48 (Fig. 2) which the metallic jumper 45 bridges when the arm 44 is in its raised position as shown in Fig. 8. The parts are preferably so porportioned and arranged that when the contacts 48 are bridged, the switch arm 44 is under a slight tension, as indicated by the upward curvature of such arm in Fig. 8 such curvature being sufficient to absorb at least part of the initial return movement of the toggle joint to the neutral plane. Similarly, the switch arm is curved in the reverse direction as shown in Figs. 1 and 5, when in its inoperative position, so that the toggle joint may move for a considerable distance (preferably the whole distance to the neutral plane) without moving the jumper 45 into the vicinity of the contacts 48, the jumper being thrown against the latter only when the toggle joint has snapped past such neutral plane.

According to the present invention, the parts are so constructed and arranged that after the switch arm 44 has been thrown, no further or excessive pressure is applied to such arm, so that distortions and other injury thereto are avoided. In the embodiment of the invention illustrated, this result is accomplished by so positioning the bellows 11 with respect to the fixed plate 17 that after the bellows has performed a predetermined amount of movement sufficient to effect overthrow of the toggle joint, it is prevented by engagement with the plate 17 from transmitting any further movement to the parts of the toggle joint mechanism. Consequently, after the temperature or pressure-responsive element has accomplished the degree of movement necessary to operate the switch, it is held against further effective movement so far as the rest of the device is concerned.

It will be clear from the above that when the toggle plates 21 and 41 are moved toward the horizontal position from the position shown in Fig. 1, they will urge the spring supports 33 and 34 outwardly; the pressure required to effect this movement of the toggle plates will be greatest at the beginning of such movement and will decrease rapidly as the blades approach the horizontal, or neutral, plane; so much so, that even before the plates reach the horizontal position, the tension in the spring supports 33 and 34 will supplement the upward pressure exerted by the rod 16 to such an extent as to throw the plates past the horizontal position and into their upper position as shown in Fig. 8.

The plates 17 and 18 are clamped against ribs 48 integral with and projecting from the inner wall of the casing by means of screws 49. The plate 18 is preferably thinner than plate 17 in order to enable the spring supports 33 and 34 to be tilted toward each other by the tightening of the screws 49 and flexing of the plate 18. The pressure exerted by the supports 33 and 34 against the adjoining ends of the toggle plates 21 and 41 may thus be adjusted by the screws 49.

By adjusting the pressure of the spring 24 upon the yoke 20, and hence upon the rod 16, the temperature at which the toggle mechanism is operated to throw the switch arm 44 may be readily adjusted. By this adjustment the temperatures at which the switch arm 44 is operated and at which it returns to the position shown in Fig. 1 are varied to substantially the same extent, the differential thus remaining the same. It is sometimes, however, desirable to vary not only the temperature range at which the switch is operated, but also the differential between the temperatures at which the switch is opened and closed. To this end I have formed the rod 22 as a screw which by rotation thereof is adjustable vertically with respect to the toggle plate 21 to vary the distance therebetween. In this way the degree of deflation or contraction of the bellows 11 requisite to effect return movement of the toggle plate 21 and hence of the switch arm 44, can be varied. The rod 22 may be held against accidental rotation by a friction member 50, and may be provided with an angular portion 51 for engagement by a wrench.

The contacts 48 are connected to terminals 52 extending externally of the casing and adapted to be connected to the electric circuit of a motor or other apparatus. It will be clear that by suitably positioning the contacts 48 below the arm 44 and mounting the jumper 45 on the underside of such arm, the switch arm 44 may be made to close a pair of contacts in the position shown in Fig. 1 and open the contacts upon operation of the toggle joint mechanism to the position shown in Fig. 8; the same result may also be accomplished by reversing the positions of the spring 24 and the responsive member 11.

The yoke 20 may be guided in its vertical movements within a guideway formed in a boss 53 extending inwardly of the casing, as shown in Fig. 4. The dial 29 may be provided with suitable indicia to indicate the temperatures to which the device has been adjusted. The flutings upon the nut 28 and upon the interior of the dial 29 may be utilized to fix the dial upon such nut with the zero indicating projection 54 on the dial against a fixed reference point 55 on the casing 10 when the spring 24 has been adjusted to a predetermined initial tension.

I claim:

1. In a temperature or pressure control device, including a responsive member adapted to expand and contract in response to temperature or pressure changes, the combination of two elements associated with each other in pivotal relation at their inner end portions and separate from said responsive member, spring means urging said elements toward each other, said elements arranged to be moved by said responsive member and adapted to snap quickly to reverse position when moved by said member toward a neutral plane, a spring arranged to urge said elements toward their original position, and a switch arm attached to one of said elements and adapted to cooperate with a terminal of an electric circuit to control the latter.

2. A control device as set forth in claim 1 wherein said spring means comprises resilient supports for the outer ends of said elements, said outer ends pivotally engaging said supports.

3. A control device as set forth in claim 1 wherein said spring means comprises resilient supports for the outer ends of said elements, said outer ends provided with knife edges bearing against said supports.

4. A control device as set forth in claim 1 wherein said elements are of unequal length, said resilient switch arm being attached to the shorter element and overlying the longer element.

5. A control device as set forth in claim 1 wherein one of said elements is provided with an extension, and a fixed member cooperating with said extension to limit the movement of the elements in both directions.

6. A control device as set forth in claim 1 wherein said spring means comprises resilient supports for the outer ends of said elements, said outer ends pivotally engaging said elements, one of said supports provided with a slot, and an extension upon one of said elements engaging within said slot and operating to limit the movement of the elements in both directions.

7. A control device as set forth in claim 1 wherein one of said elements is provided at its inner end with upward and downward extensions, and the inner end of the other element is formed as a knife edge which engages the first mentioned element between said extensions.

8. A control device as set forth in claim 1 including a stop in the path of movement of the expanding responsive member and operative to limit the pressure of said member upon the elements in such manner that, after said elements have been snapped by said responsive member, the latter exerts no further pressure upon said elements until they have again been snapped.

9. A control device as set forth in claim 1, including means for varying the tension of said spring means.

10. A control device as set forth in claim 1 wherein said spring means comprises resilient supports for the outer ends of said elements, said outer ends pivotally engaging said supports, a flexible plate to which said supporting members are attached, and means for flexing said plate to vary the distance between said spring members.

11. A control device as set forth in claim 1, including means for varying the differential between the snapping temperatures or pressures of said elements.

12. A control device as set forth in claim 1, including a yoke member straddling said elements and engaged at one side by said responsive member and at the other side by said spring, and a pin fixed to said yoke and positioned to engage one of said elements, said pin being adjustable to vary the differential of the snapping temperatures or pressures of said elements.

13. In a temperature or pressure control device, including a responsive member adapted to expand and contract in response to temperature or pressure changes, the combination of two elements associated with each other in pivotal relation at their inner end portions, resilient supports for the outer ends of said elements, said plates being of unequal length, a resilient switch arm attached to the shorter element and overlying the longer element, a yoke member straddling the longer element and said switch arm, said yoke being engaged at one side by said responsive member, a spring engaging the opposite side of said yoke and opposing the pressure of said responsive member, and a pin extending from said yoke and arranged to engage the longer element, said switch arm being perforated to receive said pin.

14. A control device as set forth in claim 13 wherein both said spring supports and the said pin are adjustable.

In testimony whereof I have hereunto set my hand.

FRANK J. BAST.